US 6,672,756 B1

(12) United States Patent
Barland

(10) Patent No.: US 6,672,756 B1
(45) Date of Patent: Jan. 6, 2004

(54) FLUID MIXER

(75) Inventor: David E. Barland, Tehachapi, CA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 14 days.

(21) Appl. No.: 10/075,143

(22) Filed: Feb. 14, 2002

(51) Int. Cl.[7] .................................................. B01F 5/00
(52) U.S. Cl. ................................ 366/175.2; 366/181.5; 366/340
(58) Field of Search ...................... 366/174.1, 175.2, 366/181.5, 337, 338, 339, 340; 431/326

(56) References Cited

U.S. PATENT DOCUMENTS

| 2,721,788 | A | * | 10/1955 | Schad ........................ 366/336 |
| 3,468,637 | A | * | 9/1969 | Hammond .................. 366/336 |
| 3,679,372 | A | * | 7/1972 | Hartman, Jr. et al. ....... 431/326 |
| 3,866,886 | A | * | 2/1975 | Thorne et al. ........... 366/181.5 |
| 5,292,246 | A | * | 3/1994 | Gateau et al. .............. 431/326 |
| 5,366,719 | A | * | 11/1994 | van Wingerden et al. .. 423/659 |
| 6,383,422 | B1 | * | 5/2002 | Hoffschmidt ............... 366/340 |

FOREIGN PATENT DOCUMENTS

WO    WO 99/10295    *    3/1999

* cited by examiner

Primary Examiner—Tony G. Soohoo
(74) Attorney, Agent, or Firm—Thomas C. Stover

(57) ABSTRACT

A multi-entry fluid mixer is provided, e.g. for mixing and injecting liquid rocket propellants, which mixer has a first set of passages for receiving fluid A and a second set of passages for receiving fluid B, the passages being separated by porous walls for mixing of fluids A and B therethrough as the fluids flow through such passages and then through a porous end wall, for further mixing and then discharge, as in, say, fuel injection into the combustion chamber of a rocket. The inventive mixer can also be employed in filtrated mixing of gases or gas/liquid combinations as well as for liquid rocket propellant injection, jet engine propellant injection, chemical mixing, aerosol formation and numerous other mixing and dispersion operations.

10 Claims, 5 Drawing Sheets

FLUID MIXER

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to fluid mixers, particularly an apertured fluid mixer.

2. Description of Related Art

A fluid mixing and injection device is useful for mixing various fluids, e.g., components of a rocket propellant. Desirably such mixers are apertured and have one or more porous walls.

In the prior art is a mixer having a porous core in a casing, which has two entry ports for two fluid components which arrive separately by the two ports to infiltrate a common porous core for mixing therein and discharge therefrom through an exit port.

A single entry porous insert for mixers is described, for example, in "New Class of Porous Injectors for Combustion Chambers and Gas Generators", V. G. Bazarov, Moscow Aviation Institute (Russia), AIAA Paper 93–1955, $29^{th}$ Joint Propulsion Conference and Exhibit, June 28 1993, Monterey, Calif.

However the size of such dual entry mixer is considerable, as is the weight thereof which detracts from the payload space remaining in a rocket propelled vehicle.

Accordingly there is need and market for a mixer that takes up less space and weight and otherwise overcomes the above prior art shortcomings.

There has now been discovered a more efficient mixer design that is of reduced size and weight, which design permits a reduction of the size of the porous core required, while achieving the desired fluid mixing properties.

SUMMARY OF THE INVENTION

Broadly the present invention provides a fluid mixer comprising:

a) a porous core having,
  at least a first set of passages for fluid A and a second set of passages for fluid B, the passages being separated by porous walls, for mixing of fluids A and B therethrough as the fluids flow through the passages and through a porous end-wall for further mixing and discharge from the core and
b) a casing with inlet and outlet ports enclosing the core.

Definitions:

By "fluid mixer" as used herein is meant a porous insert or core in an impervious casing, which core can be a porous monolith, that is of a single block or it can be bonded assembly of porous components.

BRIEF DESCRIPTION OF THE DRAWINGS

The invention will become more apparent from the following detailed specification and drawings in which.

DETAILED DESCRIPTION OF THE INVENTION

Figure 1:
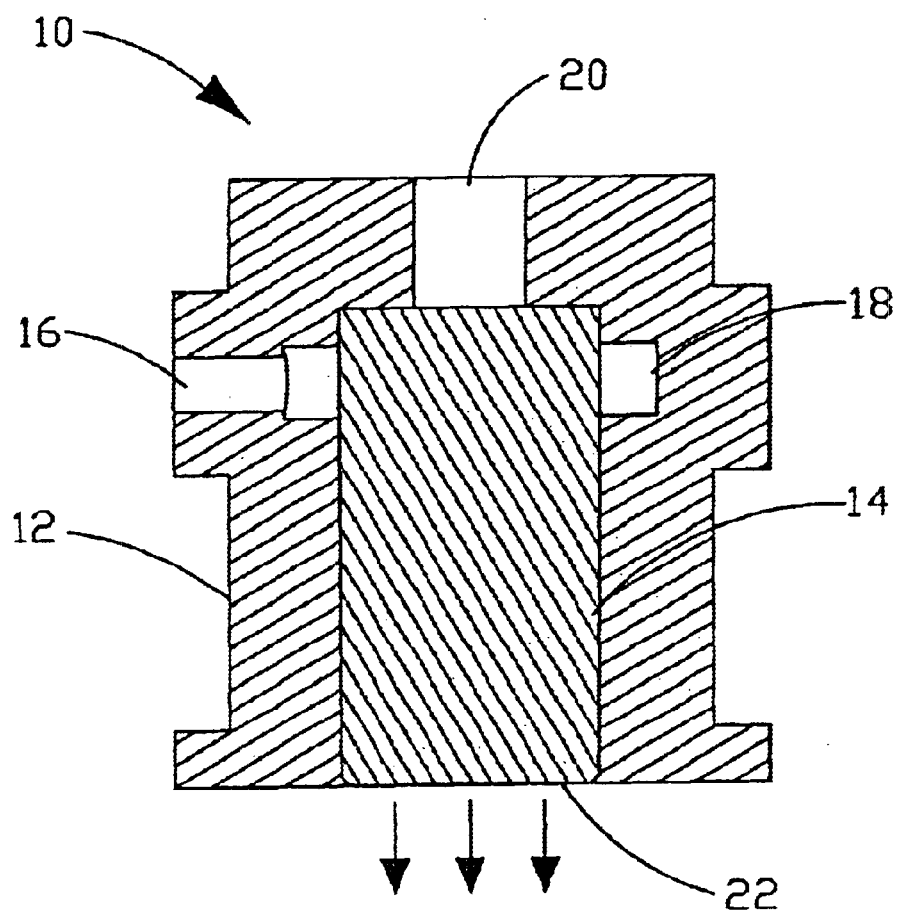
FIG. 1 is a sectional elevation schematic view of a dual entry fluid mixer of the prior art.

Referring now to in more detail to the drawings, a dual entry mixer 10, having casing 12 and porous core 14, admits fluid A through port 16 and cavity 18 and fluid B through port 20, so that fluids A & B mix and flow through porous core 14 and exit at the bottom wall 22 of such core, as shown in FIG. 1.

Figure 2:
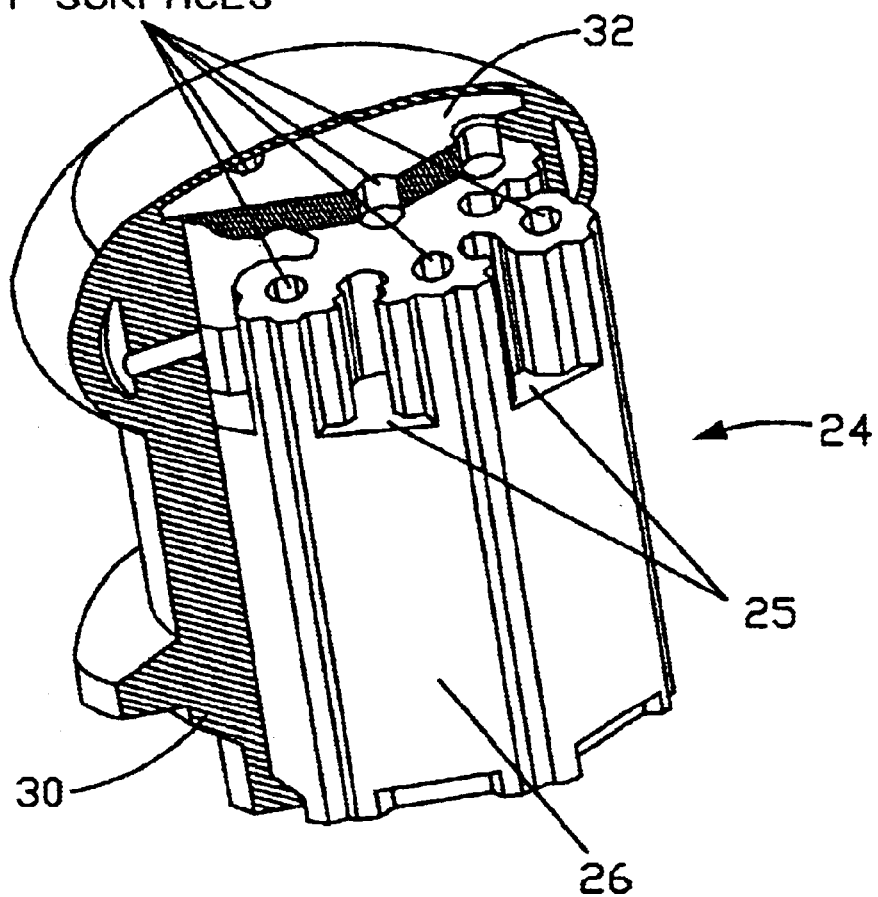
FIGS. 2 & 3 are oppositely tilted, cut-away, perspective, schematic views of a multi-entry fluid mixer embodying the present invention
Figure 3:
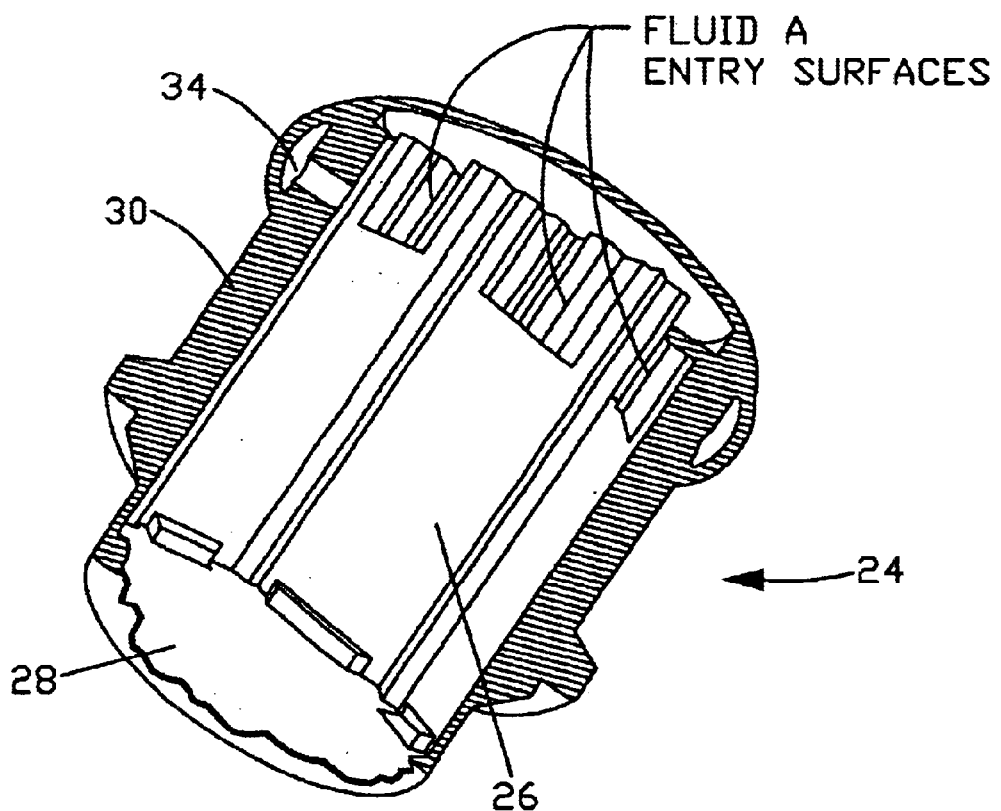

The invention provides, per FIGS. 2 and 3, a distributed-entry, multi-passaged mixer 24 for fluids, having a porous core 26 mounted within a casing 30. The core 26 has a plurality of A passages separated from a plurality of B passages, as shown in FIGS. 2 & 3. That is, fluid A and fluid B pass through such mixer in their indicated separate passages and diffuse through their respective porous walls, including common end wall 25, for intermixing in the core 26 and discharge through the core bottom surface 28, as indicated in FIGS. 2 and 3.

Also as indicated in FIGS. 2 and 3, two fluids are introduced into the porous core via fluid distribution plenums. Fluid B enters the porous core via the top distribution plenum 32, while fluid A enters via a second plenum 34, located on the periphery of the porous core. Each plenum directs entry of one fluid through separate boundary surfaces of the porous core. As fluids enter the porous core, a mixing process ensues. The fluids flow and intermix with each other by a combination of convection and diffusion processes, which are limited by the distributed fluid flow resistance of the porous core and the fluid mixture eventually exits the surface of least pressure, such as core bottom surface 28.

Figure 4:
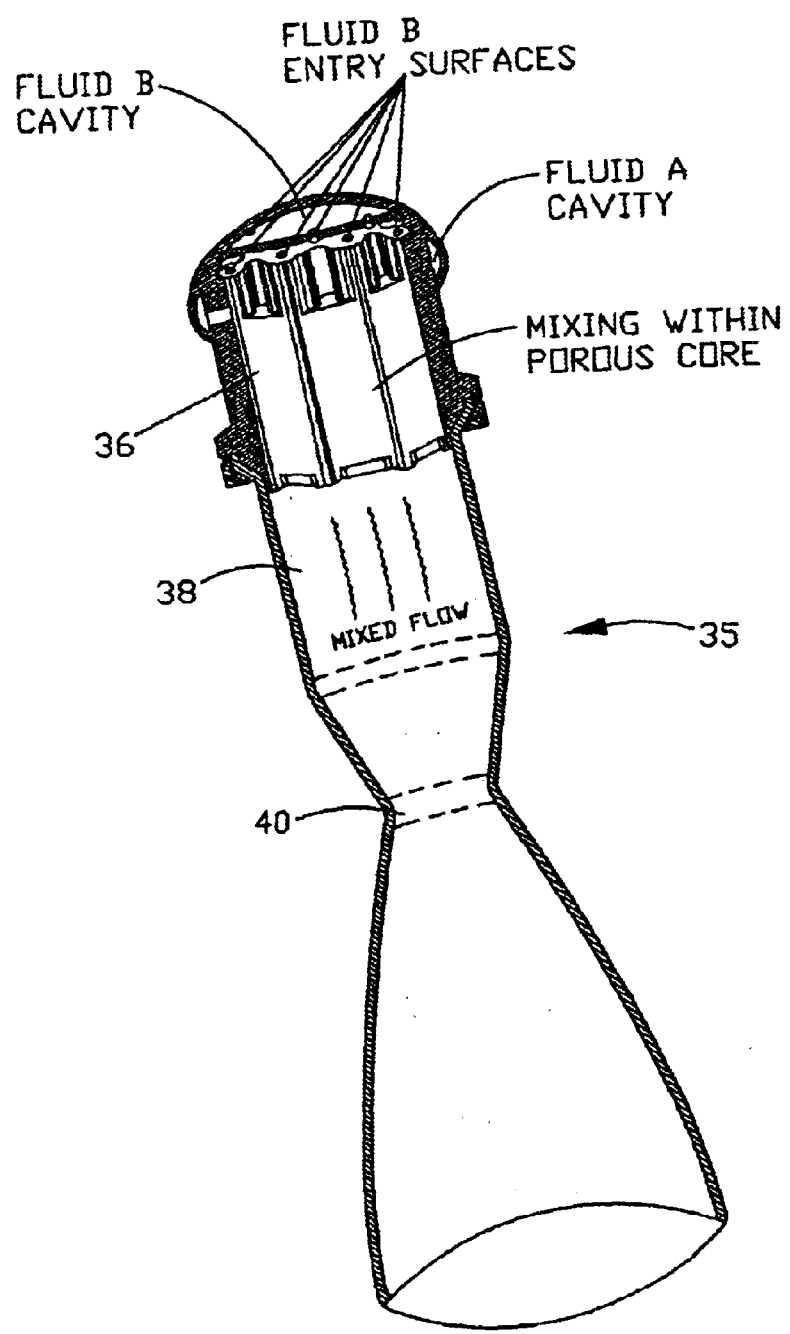
FIGS. 4 & 5 are oppositely tilted, cut-away, perspective, schematic views of a portion of a rocket engine employing the fluid mixer of the present invention as a fuel injector.
Figure 5:
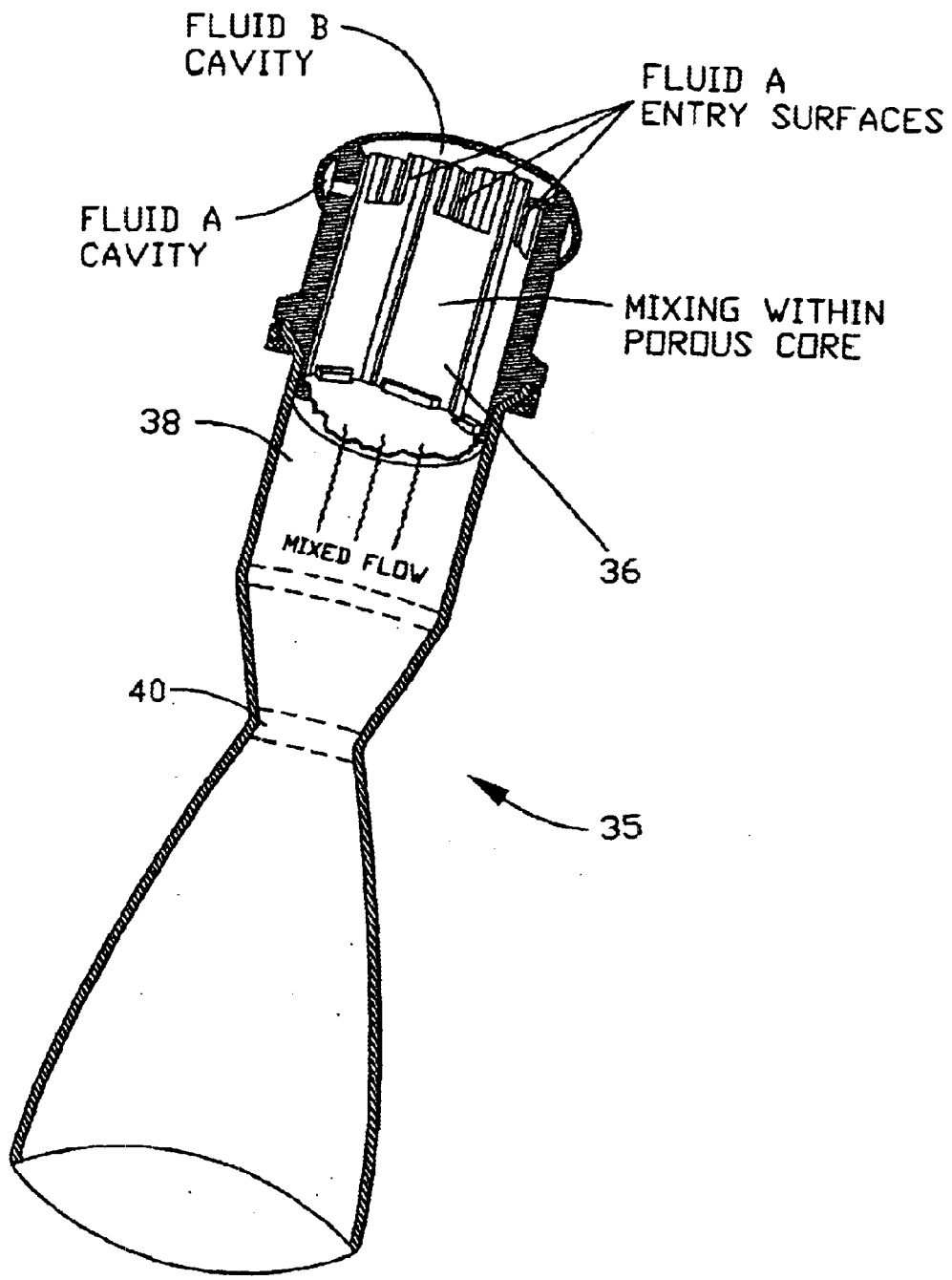

In FIGS. 4 & 5, a potential application of the mixer of the invention, in the form of a fuel injector 36, for the combustion chamber 38 of a liquid rocket engine 35, is shown. In the manner of the mixer 24 of FIGS. 2 & 3, the fuel injector 36 has separate A and B fluid passages separated by porous walls, for intermixing and discharge as described above with respect to mixer 24. Such intermixed flow discharges into combustion chamber 38 for combustion, and discharges out the nozzle 40 of rocket engine 35, as indicated in FIGS. 4 & 5.

Thus the present invention provides a fluid mixer or a fluid mixing and injection device, having mounted within, a porous core or insert, which can be constructed from a single monolithic porous solid or from a bonded assembly of smaller porous solid elements. The porous core permits multiple points or surfaces of fluid entry and exit, and, in comparison to a porous mixing device of FIG. 1, with dual fluid entry ports, reduces the length of the porous core required to achieve desired fluid mixing properties. The core permits distribution of fluid entry points and surfaces, which may be utilized to establish initial flow conditions allowing diffusive-limited mixing of fluids to occur in a shorter core (and mixer) length and hence, more efficient use of the volume of porous material.

As indicated in FIGS. 2 and 3 above the multi-entry fluid mixer of the invention includes a porous insert or core in a casing. The core can be made of sintered, cellular or etched materials and have a pore size range of 1 Å to 2540 $\mu$ (or 100 mils). The casing, meanwhile, is desirably made of durable impervious material.

A small pore size, e.g., per the above range, for a rocket engine, can provide an important safety feature in a rocket combustion chamber. That is, by having pore sizes smaller than the quenching distance of the flame in the chamber, the porous injection device allows propellants to be safely premixed prior to injection and can relax mixing requirements in the chamber itself, resulting in potentially greater performance and/or reduced chamber weight (shorter chamber). The invention thus advances the state of the art in which propellants are kept separated in the manifold at all times until just before injection. Accordingly, there is a potential for a major increase in payload, worth up to millions of dollars per launch, thanks to the fluid mixer of the present invention.

The constituents of the ligaments of the porous insert can be of an inert material for non-reactive mixing processes or of a catalytic nature to promote a desired chemical reaction.

The multi-entry mixer of the invention has potential application by the government in liquid rocket propellant injection, jet engine propellant injection, multiple species chemical mixing, explosive aerosol formation, diffusive fluid dispersion, fluidized bed combustion, industrial mixing processes and waste material incineration.

Further the mixer of the invention can be utilized in filtrated mixing of binary gases and/or miscible or immiscible gas/liquid combinations. The inventive mixer has application in low-pressure and high-pressure combustion processes, including filtration combustion and premixed reactant combustion, inert mixing processes, atomization and aerosol processes, and distributed flow processes.

Also there are potential applications to other industries involved with the combustion of gaseous fuels. Examples of the latter include home heating and the chemical process industry.

What is claimed is:

1. A fluid mixer comprising:
   a) an porous core having,
      a first set of passages for fluid A and a second set of passages for fluid B, at least some of said passages terminating in a porous endwall, said passages being separated by porous walls for mixing of fluids A and B therethrough as said fluids flow through said passages and through said porous end wall to discharge from said core and
   b) a casing with inlet and outlet ports enclosing said core.

2. The mixer of claim 1 wherein said casing has an inlet port A leading only to said first set of passages and an inlet port B leading separately to said second set of passages.

3. The mixer of claim 2 having distribution of fluid entry points and surfaces to permit diffusive-limited mixing of fluids passing therethrough.

4. The mixer of claim 2 having a pair of plenums, one plenum directing entry of fluid A through said first set of passages and the other plenum directing entry of fluid B through said second set of passages so that the two fluids flow and intermix with each other through said porous walls by convection and diffusion until the resulting fluid mixture exits through porous walls of the mixer core.

5. The mixer of claim 2 serving as a fuel injector to the combustion chamber of a rocket, which mixer has pore sizes smaller than the quenching distance of the flame in said combustion chamber to allow propellants to be safely premixed prior to injection to said combustion chamber.

6. The mixer of claim 1 serving as a fuel injector to the combustion chamber of a rocket.

7. The mixer of claim 1 wherein said fluid is selected from the group of binary gases, miscible gas/liquid combinations and immiscible gas/liquid combinations.

8. The mixer of claim 1 employed in low-pressure and high-pressure combustion processes, filtration combustion, premixed reactant combustion, inert mixing processes, atomization processes, aerosol processes or distributed flow processes.

9. The mixer of claim 1 employed in liquid rocket propellant injection, jet engine propellant injection, multiple species chemical mixing, explosive aerosol formation, diffusive fluid dispersion, fluidized bed combustion, industrial mixing processes or waste material incineration.

10. The fluid mixer of claim 1 having a porous core with pores in a range of 1 Å to 2540$\mu$, which core is enclosed in a casing.

* * * * *